(12) United States Patent
Kitaguchi et al.

(10) Patent No.: US 8,882,179 B2
(45) Date of Patent: Nov. 11, 2014

(54) BODY FOR DUMP TRUCK

(75) Inventors: Atsushi Kitaguchi, Tsuchiura (JP);
Takayuki Satou, Tsuchiura (JP);
Kazunori Ishihara, Tsuchiura (JP);
Yasuki Kita, Tsuchiura (JP); Takehito Ikema, Tsuchiura (JP); Tomohiko Yasuda, Tsuchiura (JP); Takashi Sasaki, Tsuchiura (JP); Yoshifumi Nabeshima, Tsuchiura (JP); Hitomi Ooshima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/808,671

(22) PCT Filed: Jul. 14, 2010

(86) PCT No.: PCT/JP2010/004580
§ 371 (c)(1),
(2), (4) Date: Jan. 7, 2013

(87) PCT Pub. No.: WO2012/007994
PCT Pub. Date: Jan. 19, 2012

(65) Prior Publication Data
US 2013/0106137 A1    May 2, 2013

(51) Int. Cl.
*B60P 1/28* (2006.01)
(52) U.S. Cl.
CPC .. *B60P 1/28* (2013.01); *B60P 1/286* (2013.01)
USPC ...................................................... 296/183.2
(58) Field of Classification Search
USPC ...................................................... 296/183.2
See application file for complete search history.

(56) References Cited

U.S. PATENT DOCUMENTS

| 3,363,933 A | 1/1968 | Wilson |
| 3,462,187 A | 8/1969 | Hassler |
| 4,474,404 A | 10/1984 | Hagenbuch |

(Continued)

FOREIGN PATENT DOCUMENTS

| EP | 0 098 127 A1 | 1/1984 |
| GB | 887117 | 1/1962 |

(Continued)

OTHER PUBLICATIONS

International Search Report dated Mar. 1, 2011 (three (3) pages).

*Primary Examiner* — Glenn Dayoan
*Assistant Examiner* — Jason S Daniels
(74) *Attorney, Agent, or Firm* — Crowell & Moring LLP

(57) ABSTRACT

A body for a dump truck includes a body frame, a bottom wall, front wall and left and right side walls arranged on the body frame. The bottom wall, front wall and left and right side walls define a payload section for loading a payload, an earth/sand anti-sticking device is arranged in a corner part of the payload section to prevent earth or sand from sticking in the corner part. A steel member is arranged outside and opposite to the earth/sand anti-sticking device such that a space is formed between the steel member and the earth/sand anti-sticking device. The body includes at least one steel rib having a ridge extending out from a surface of a plate that forms the earth/sand anti-sticking device, the ridge is fixedly secured by welding to the plate that forms the earth/sand anti-sticking device.

6 Claims, 7 Drawing Sheets

(56) References Cited

U.S. PATENT DOCUMENTS

| | | | |
|---|---|---|---|
| 4,826,233 A * | 5/1989 | Hagenbuch | 296/39.3 |
| 5,312,162 A | 5/1994 | Baebel | |
| 5,431,475 A * | 7/1995 | Perry | 296/183.1 |
| 5,662,374 A * | 9/1997 | Wheeler | 296/183.2 |
| 6,592,171 B1 | 7/2003 | Hinds | |
| 6,592,172 B2 | 7/2003 | Fujan et al. | |
| 2004/0026959 A1* | 2/2004 | Kostecki | 296/183.2 |
| 2004/0036245 A1 | 2/2004 | Mollhagen | |
| 2008/0067856 A1* | 3/2008 | Hagenbuch | 298/17 R |

FOREIGN PATENT DOCUMENTS

| | | |
|---|---|---|
| JP | 52-109224 A | 9/1977 |
| JP | 53-87416 A | 8/1978 |
| JP | 57-51580 A | 3/1982 |
| JP | 59-11981 A | 1/1984 |
| JP | 2000-203325 A | 7/2000 |
| JP | 2001-3389 A | 1/2001 |

* cited by examiner

BODY FOR DUMP TRUCK

TECHNICAL FIELD

This invention relates to a body for a dump truck, which is provided with a payload section defined by a bottom wall, a front wall, and left and right side walls, and also with plural stiffeners installed on outer sides of the payload section and reinforcing the associated ones of the bottom wall, front wall and left and right side walls.

BACKGROUND ART

Patent Citation 1 discloses a dump truck. This dump truck is provided with a pair of left and right front wheels, a pair of left and right rear wheels, a frame, an operator's cab arranged on the frame at a front position thereof, and a body arranged on the frame.

Patent Citation 2 shows a body for a dump truck, which is constructed as described above. This body includes a body frame, and a bottom wall, front wall and left and right side walls arranged on the body frame. Defined by the bottom wall, front wall and left and right side walls is a payload section in which an object to be hauled such as earth or sand, that is, a payload is loaded. Many stiffeners are installed at positions on outer sides of the payload section. These stiffeners are installed extending in vertical directions or horizontal directions of the associated ones of the bottom wall, front wall and left and right side walls defining the payload section, and are reinforcing these walls.

Patent Citation 3 shows a construction in which sloping devices are provided in corner parts of a bottom wall forming a payload section of a body for a dump truck. These sloping devices make up earth/sand anti-sticking devices that prevent sticking of earth or sand loaded in the payload section.

In general, a payload such as earth or sand is loaded in a heap in the payload section formed in the body of each dump truck described above, and by the payload, a high load is applied to the body. Rigidity is, therefore, required for the body. To assure this rigidity, many stiffeners are installed on parts of outer sides of the payload section as disclosed in the above-discussed Patent Citation 2.

CITATION LIST

Patent Literature

[PTL 1] U.S. Pat. No. 6,592,171
[PTL 2] U.S. Pat. No. 6,592,172
[PTL 3] US-A-2004/0036245

SUMMARY OF INVENTION

Technical Problem

Many stiffeners, specifically steel stiffeners are conventionally installed on parts of outer sides of a payload section as described above, so that there is a problem in that the weight of a body becomes greater. Accordingly, a restriction is imposed on the authorized payload of the payload section of the body. Further, the mounting of the body leads to a deterioration in the travel fuel economy of a dump truck.

With the above-described circumstances of the conventional technologies in view, the present invention has as an object thereof the provision of a body for a dump truck, which is lightweight and can assure sufficient rigidity.

Solution to Problem

To achieve this object, the present invention provides a body for a dump truck. The body is to be mounted on a frame of the dump truck, and includes a body frame, a bottom wall, front wall and left and right side walls arranged on the body frame. The bottom wall, front wall and left and right side walls define a payload section for loading a payload therein. The body has an earth/sand anti-sticking device arranged in a corner part of the payload section to prevent earth or sand, which is to be loaded in the payload section, from sticking in the corner part. The body also has a steel member arranged outside and opposite the earth/sand anti-sticking device such that a space is formed between the steel member and the earth/sand anti-sticking device. The earth/sand anti-sticking device is made of a steel plate. The steel member is formed of at least one combination of mutually-adjacent plural ones of the bottom wall, front wall and left and right side walls. The space comprises a hollow part formed by the respective walls in the at least one combination and the plate that forms the earth/sand anti-sticking device. The body is provided with at least one steel rib arranged in the hollow part, fixedly secured to the respective walls in the at least one combination by welding to reinforce the respective walls in the at least one combination, and having a ridge extending out from a surface of the plate that forms the earth/sand anti-sticking device. The ridge is fixedly secured by welding to the plate that forms the earth/sand anti-sticking device.

According to the present invention constructed as described above, the at least one combination of the mutually-adjacent plural ones of the bottom wall, front wall and left and right side walls can be reinforced by the at least one steel rib arranged in the hollow part, which is formed between the plate forming the earth/sand anti-sticking device arranged in the corner part of the payload section and the plural walls in the at least one combination, and having a ridge fixedly secured by welding to the plate that forms the earth/sand anti-sticking device. Sufficient rigidity can, therefore, be assured even if fewer stiffeners are installed on parts of outer sides of the payload section. Further, the rib is arranged in the hollow part between the plate, which forms the earth/sand anti-sticking device, and the plural walls in the at least one combination, so that the shape and dimensions of the rib can be made far smaller compared with those of the stiffeners installed on the parts of the outer sides of the payload section. Described specifically, the total weight of such ribs and stiffeners can be significantly reduced compared with the total weight that would result if only stiffeners were installed in a large number, and therefore, the weight of the body can be reduced. Accordingly, the present invention can assure a light weight and also sufficient rigidity.

Further, the at least one combination of mutually-adjacent plural walls are each reinforced by the rib, so that the walls can be set smaller in thickness. The setting of such a smaller wall thickness can, therefore, realize a further weight reduction. The ridge of the rib and the plate, which forms the earth/sand anti-sticking device, are fixedly secured to each other by welding, and therefore, a load of a payload can be transmitted from the plate, which forms the earth/sand anti-sticking device, to the rib, and the load transmitted to the rib can then be transmitted to the associated ones of the bottom wall, front wall and left and right side walls. It is hence possible to reduce a load to be applied to the plate that forms the earth/sand anti-sticking device. In addition, the rib and the plate, which forms the earth/sand anti-sticking device, can be integrally arranged owing to the welding at the ridge of the rib, thereby making it possible to provide the payload section with high rigidity.

The body according to the present invention may also be characterized in that in the above-described invention, the body is further provided with a steel stiffener installed on an outer side of one of the bottom wall, front wall and left and right walls to reinforce the associated wall, and the rib is arranged at a position such that the rib is connected to the stiffener with the associated wall interposed therebetween. According to the present invention constructed as described above, a load of a payload as transmitted from the plate, which forms the earth/sand anti-sticking device, to the rib can be surely transmitted to the stiffener via the associated wall interposed between the rib and the stiffener.

The body according to the present invention may also be characterized in that in the above-described invention, the body is further provided with at least one additional steel rib arranged inside the hollow part, fixedly secured to the respective walls in the at least one combination by welding to reinforce the respective walls in the at least one combination, and arranged such that the additional steel rib comes into contact with the plate that forms the earth/sand anti-sticking device. According to the present invention constructed as described above, the plate which forms earth/sand anti-sticking device comes into contact with the additional rib under a load of a payload as transmitted to the plate that forms the earth/sand anti-sticking device, and therefore, the load of the payload can be transmitted to the associated ones of the bottom wall, front wall and left and right side walls. A contribution can hence be made toward reducing a load to be applied to the plate that forms the earth/sand anti-sticking device.

The body according to the present invention may also be characterized in that in the above-described invention, the plate is arranged as a discrete member from the associated ones of the bottom wall, front wall and left and right side walls and is formed of a sloping plate arranged aslant relative to the associated walls or a curved plate forming a curved surface. According to the present invention constructed as described above, no cumbersome bending work is needed for the formation of the plate as the earth/sand anti-sticking device on the associated ones of the bottom wall, front wall and left and right side walls, and the plate that is the earth/sand anti-sticking device can be arranged with relative ease by welding the sloping plate or curved plate to the associated ones of the bottom wall, front wall and left and right side walls.

Advantageous Effects of Invention

The present invention has the construction that the earth/sand anti-sticking device is made of the steel plate, the steel member arranged opposite the plate is formed of the at least one combination of mutually-adjacent plural ones of the bottom wall, front wall and left and right side walls, the space between the plate, which forms the earth/sand anti-sticking device, and the plural steel walls in the at least one combination comprises the hollow part formed by the respective walls in the at least one combination and the plate that forms the earth/sand anti-sticking device, and the body is provided with the at least one steel rib arranged in the hollow part, fixedly secured to the respective walls in the at least one combination by welding to reinforce the respective walls in the one combination, and having the ridge extending out from the surface of the plate that forms the earth/sand anti-sticking device, and the ridge is fixedly secured by welding to the plate that forms the earth/sand anti-sticking device. It is, therefore, possible to assure a light weight and also sufficient rigidity. Owing to these advantageous effects, the restriction to the authorized payload of the payload section can be relaxed. Compared with the conventional dump trucks, it is thus possible to increase the authorized payload and to improve the efficiency of hauling work by the dump truck. Moreover, the dump truck can enjoy improved travel fuel efficiency compared with the conventional dump trucks, and therefore, can assure excellent economy.

In the present invention, the at least one combination of mutually-adjacent plural walls are each reinforced by the rib, so that the walls can be set smaller in thickness. Therefore, the setting of such a smaller wall thickness can realize a further weight reduction, and in addition, can manufacture the body at lower cost. The ridge of the rib and the plate, which forms the earth/sand anti-sticking device, are fixedly secured to each other by welding, and therefore, a load of a payload can be transmitted from the plate, which forms the earth/sand anti-sticking device, to the rib, and the load transmitted to the rib can then be transmitted to the associated ones of the bottom wall, front wall and left and right side walls. It is hence possible to reduce a load to be applied to the plate that forms the earth/sand anti-sticking device so that the plate, which forms the earth/sand anti-sticking device, can be provided with improved durability and a highly-reliable body structure can be realized. In addition, the rib and the plate, which forms the earth/sand anti-sticking device, can be integrally arranged owing to the welding at the ridge of the rib, thereby making it possible to provide the payload section with high rigidity. This also makes it possible to realize a highly-reliable body structure.

DESCRIPTION OF EMBODIMENTS

The embodiments of the body according to the present invention for the dump truck will hereinafter be described based on the drawings.

Figure 1:
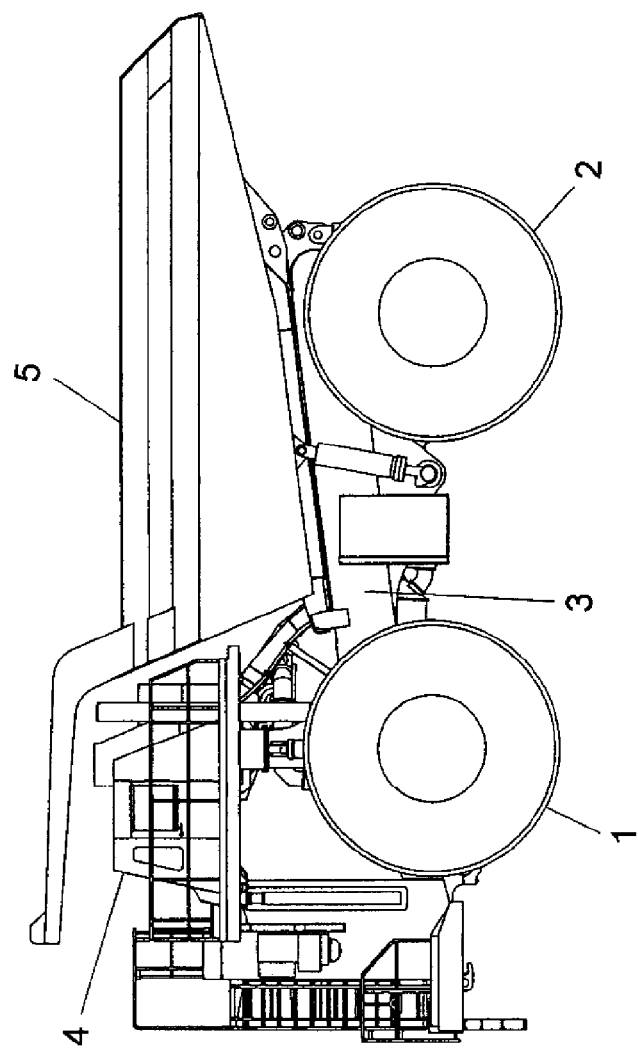
FIG. 1 is a side view illustrating a dump truck provided with a first embodiment of the body according to the present invention.

As illustrated in FIG. 1, the dump truck provided with the first embodiment of the body according to the present invention is provided with a pair of left and right front wheels 1, a pair of left and right rear wheels 2, and a frame 3. Also provided are an operator's cab 4 arranged on the frame 3 at a front position thereof, and a body 5 of the first embodiment mounted on the frame 3.

Figure 2:
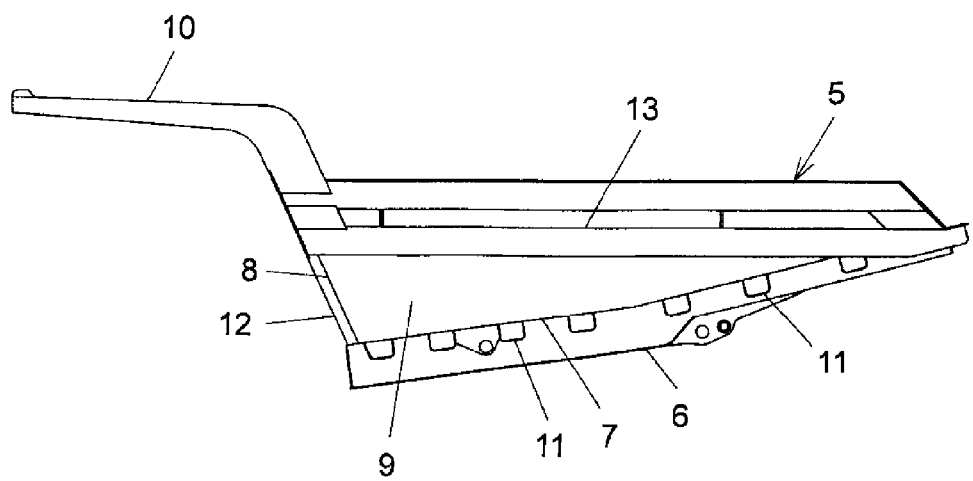
FIG. 2 is a side view illustrating the first embodiment of the body according to the present invention.
Figure 3:
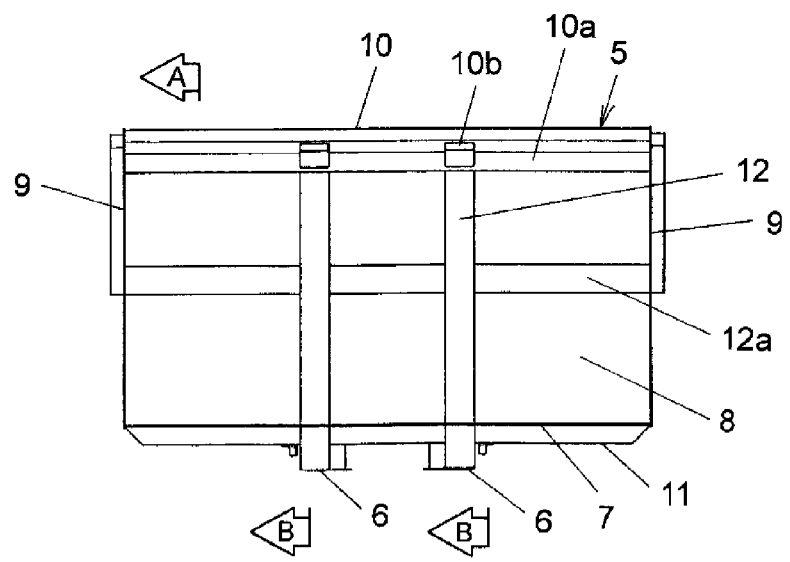
FIG. 3 is a front view illustrating the first embodiment of the body according to the present invention.
Figure 4:
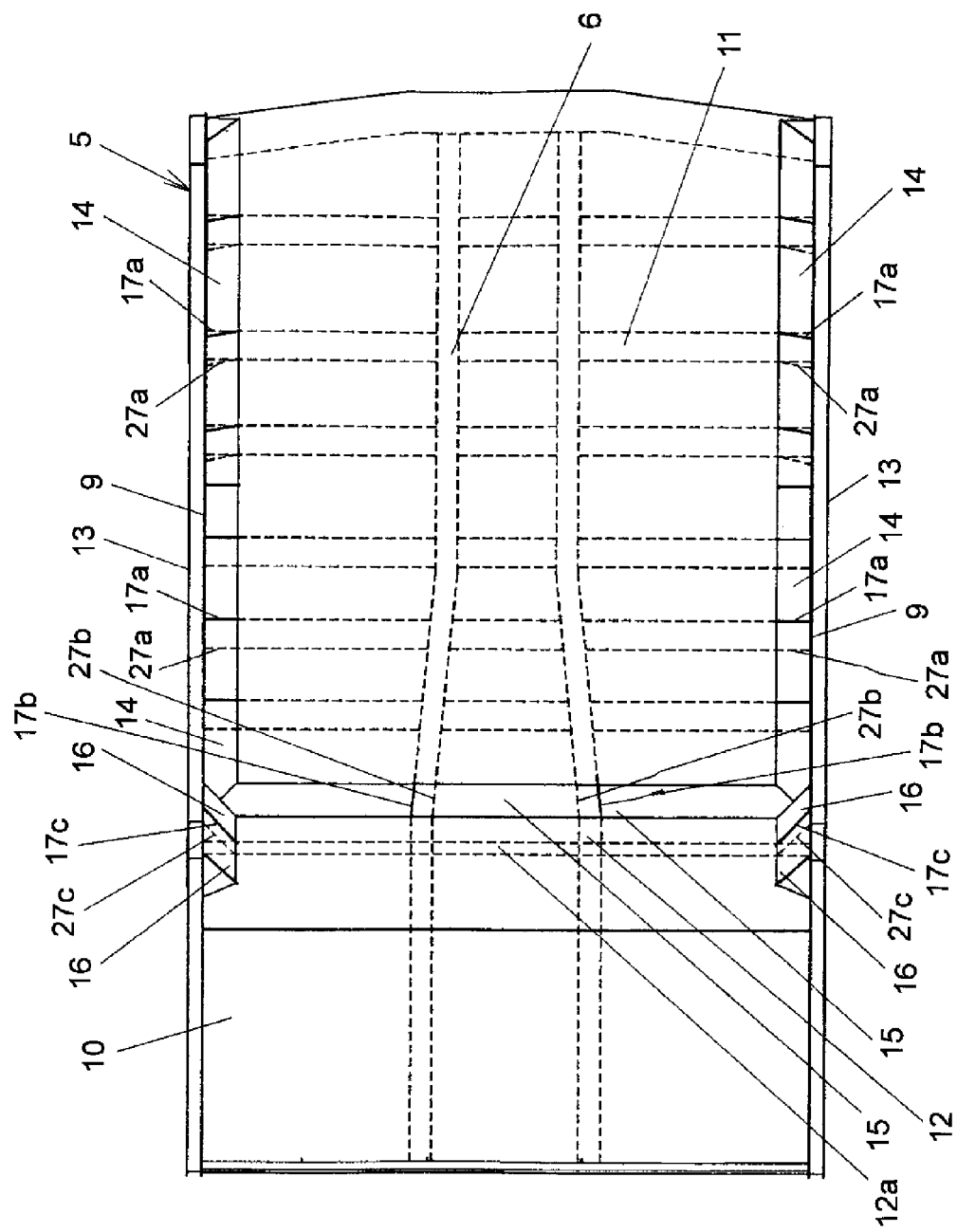
FIG. 4 is a plan view illustrating the first embodiment of the body according to the present invention.
Figure 5:
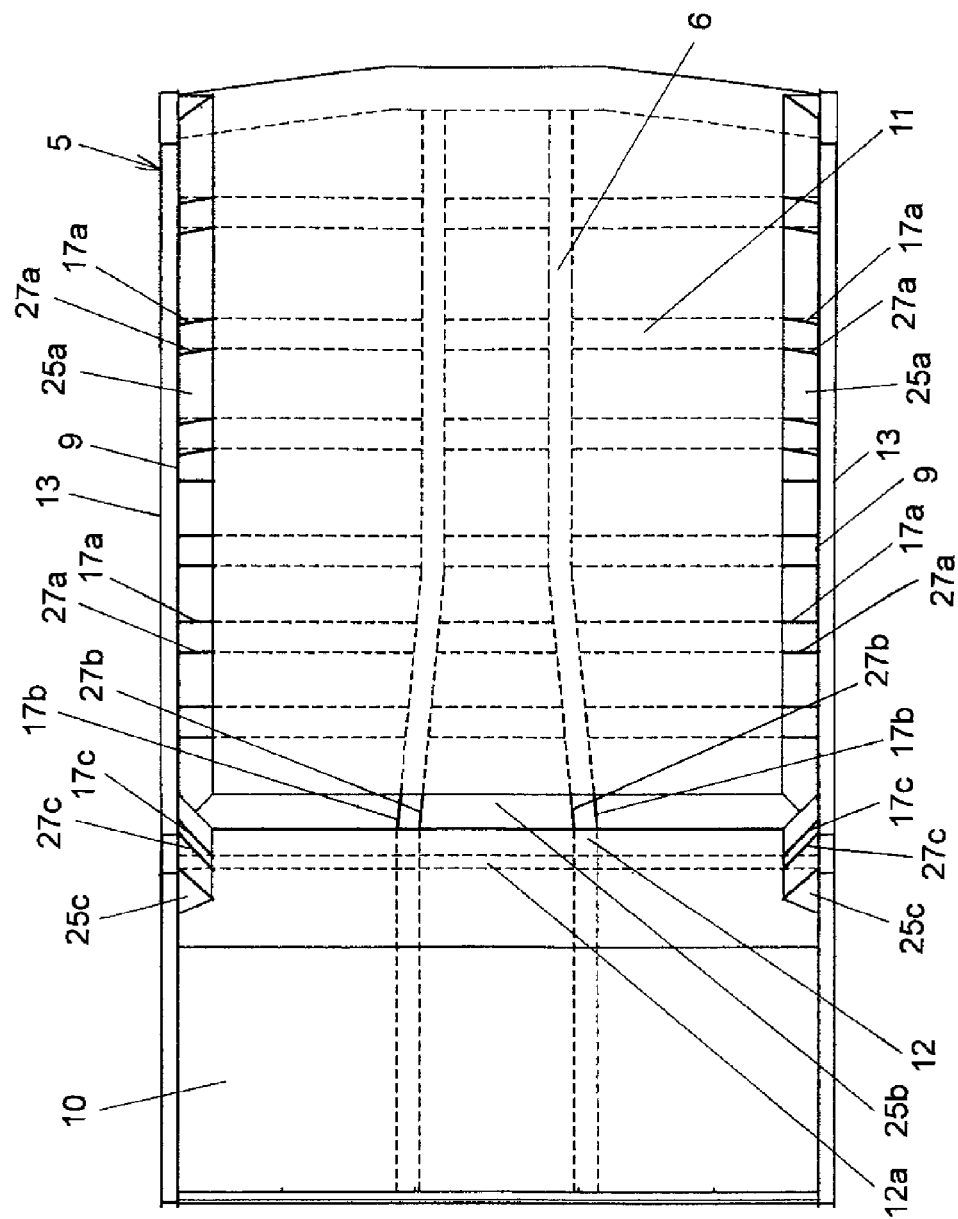
FIG. 5 is a plan view illustrating the construction of FIG. 4 without sloping plates as plates that form earth/sand anti-sticking devices.

FIGS. 2 to 5 are views illustrating the first embodiment of the body according to the present invention, in which FIG. 2 is a side view, FIG. 3 is a front view, FIG. 4 is a plan view, and FIG. 5 is a plan view illustrating the construction of FIG. 4 without sloping plates as plates that form earth/sand anti-sticking devices.

As illustrated in these FIGS. 2 to 5, the body 5 includes a body frames 6 arranged extending in the front-to-rear direction, and a bottom wall 7, front wall 8 and left and right side walls 9 arranged on the body frames 6 and made, for example, of steel plates, respectively. The mutually-adjacent ones of these walls have been fixedly secured together by welding. The bottom wall 7, front wall 8 and left and right side walls 9 define a payload section in which an object to be hauled such as earth or sand, that is, a payload is loaded. A canopy 10 made of a steel plate is fixedly secured on the front wall 8 such that it covers over the operator's cab 4 as also depicted in FIG. 1.

At positions on respective outer sides of the bottom wall 7, front wall 8 and left and right side walls 9 defining the payload section, steel stiffeners are installed extending in vertical or horizontal directions on the associated walls. These steel stiffeners have been fixedly secured by welding to reinforce the associated walls. Described specifically, the bottom wall 7 is provided, as depicted in FIGS. 2 to 5, with plural stiffeners 11 installed in a lateral direction such that they extend at right angles to the body frames 6 arranged extending in the front-to-rear direction. The front wall 8 is provided with two stiffeners 12 installed extending in a vertical direction and also with a single stiffener 12a installed in the lateral direction such that it extends at right angles to the stiffeners 12. The left and right side walls 9 are each provided with two stiffeners 13 installed in the front-to-rear direction. As shown in FIG. 3, the canopy 10 is provided on a lower side thereof with a single stiffener 10a installed extending in the lateral direction and also with two stiffeners 10b installed in the front-to-rear direction such that they extend at right angles to the stiffener 10a.

As illustrated in FIGS. 4 and 5, in corner parts of the payload section, said corner parts including seams of the payload section, earth/sand anti-sticking devices are arranged to prevent sticking of earth or sand to be loaded in the payload section. These earth/sand anti-sticking devices are arranged as discrete members, for example, from the associated ones of the bottom wall 7, front wall 8 and left and right side walls 9, and are formed of sloping plates 14-16 arranged aslant relative to the associated walls. Described specifically, the sloping plates 14 are individually arranged in two corner parts formed by the bottom wall 7 and the left and right side walls 9 and extending in the front-to-rear direction, and these sloping plates 14 have been fixedly secured by welding to the bottom wall 7 and also to the associated ones of the left and right side walls 9. The sloping plate 15 is arranged in a corner part formed by the bottom wall 7 and the front wall 8 and extending in the lateral direction, and this sloping plate 15 has been fixedly secured to the bottom wall 7 and the front wall 8, respectively, by welding. Further, the sloping plates 16 are individually arranged in two corner parts formed by the front wall 8 and the left and right side walls 9, respectively, and extending in the vertical direction, and these sloping plates 16 have been fixedly secured by welding to the front wall 8 and also to the associated ones of the left and right side walls 9.

Figure 6:
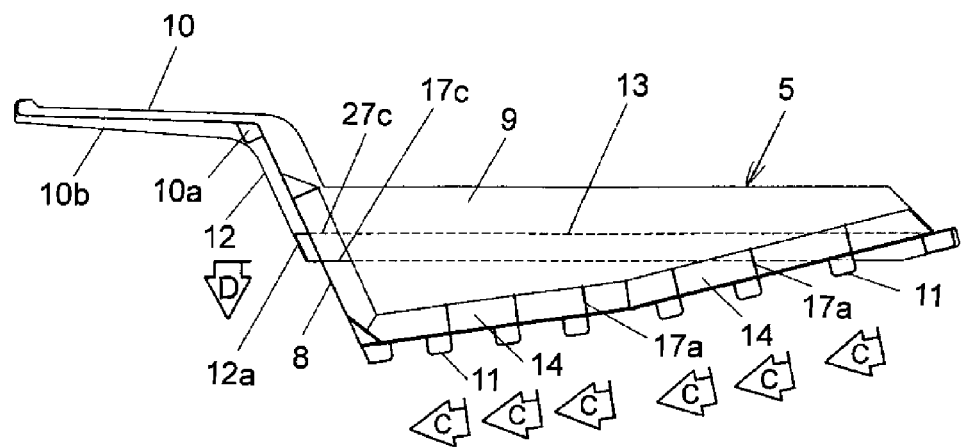
FIG. 6 is a cross-sectional view taken in the direction of arrow A in FIG. 3.
Figure 7:
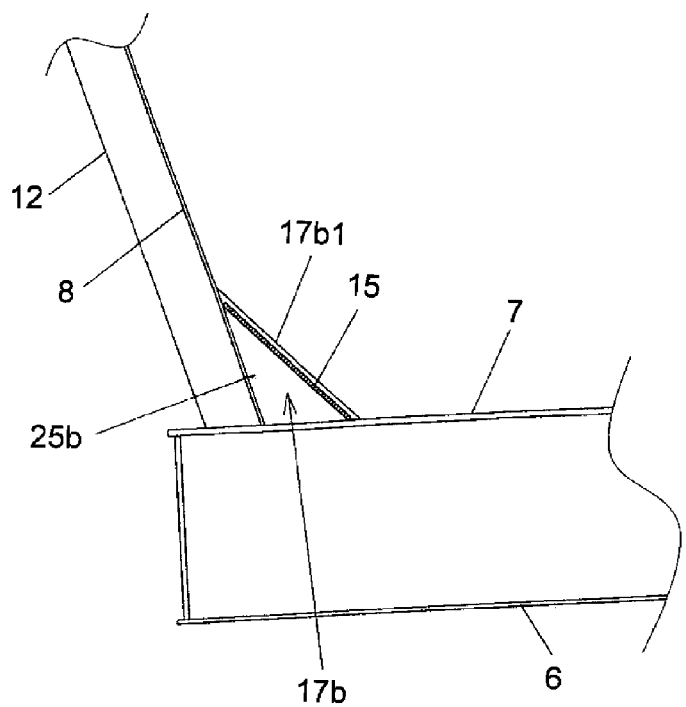
FIG. 7 is an enlarged cross-sectional view taken in the direction of arrow B in FIG. 3.
Figure 8:
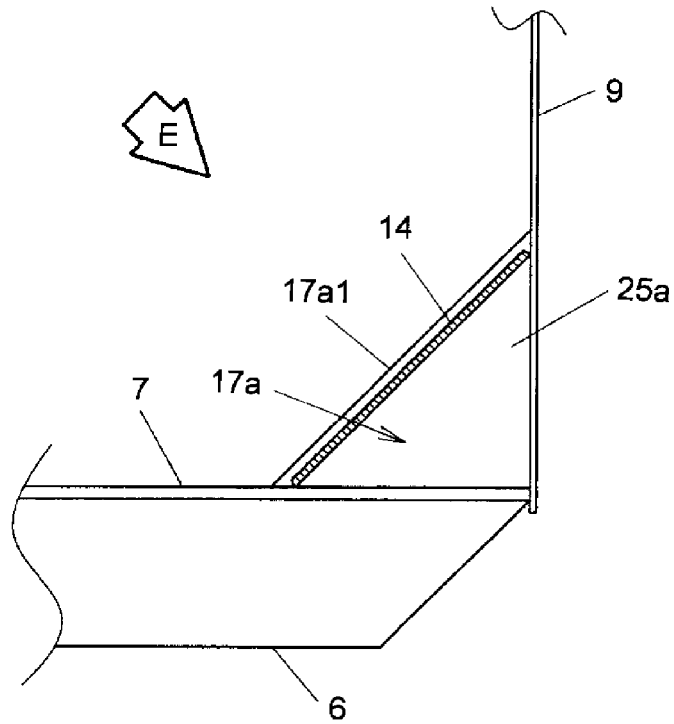
FIG. 8 is an enlarged cross-sectional view taken in the direction of arrow C in FIG. 6.
Figure 9:
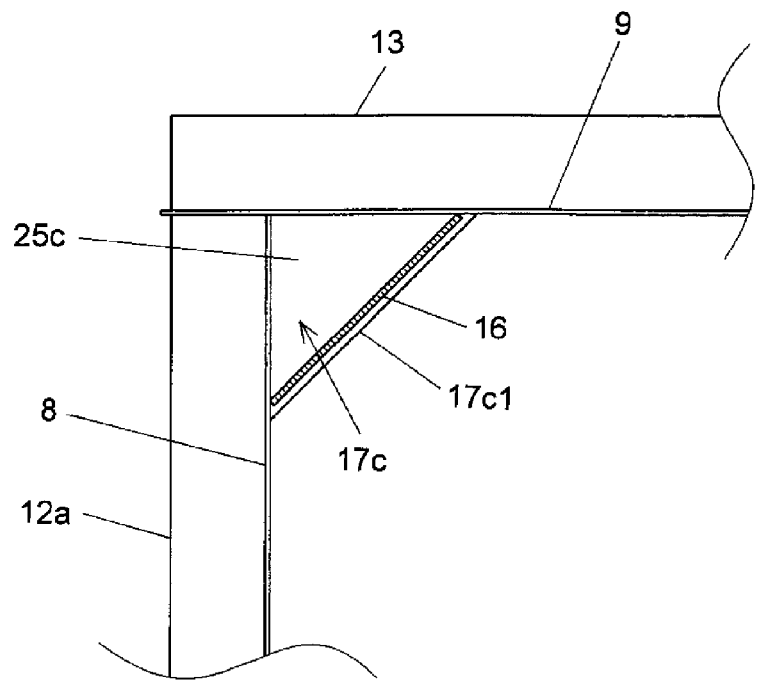
FIG. 9 is an enlarged cross-sectional view taken in the direction of arrow D in FIG. 6.
Figure 10:
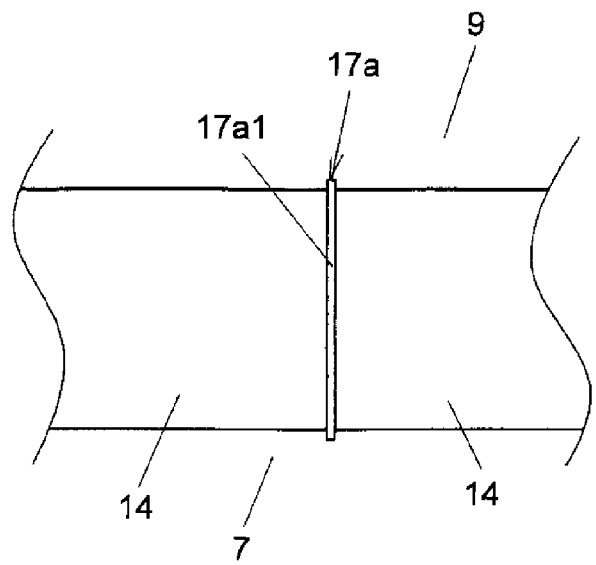
FIG. 10 is a view taken in the direction of arrow E in FIG. 8.

FIG. 6 is a cross-sectional view taken in the direction of arrow A in FIG. 3, FIG. 7 is an enlarged cross-sectional view taken in the direction of arrow B in FIG. 3, FIG. 8 is an enlarged cross-sectional view taken in the direction of arrow C in FIG. 6, FIG. 9 is an enlarged cross-sectional view taken in the direction of arrow D in FIG. 6, and FIG. 10 is a view taken in the direction of arrow E in FIG. 8.

Between the above-described earth/sand anti-sticking devices, that is, the sloping plates 14-16 and the steel members arranged opposite these sloping plates 14-16, that is, the associated ones of the bottom wall 7, front wall 8 and left and right side walls 9, spaces, specifically hollow parts 25a-25c depicted in FIGS. 5, 7, 8 and 9 are formed. As shown in FIGS. 5 and 8, the two hollow parts 25a are formed by the bottom wall 7, the associated ones of the left and right side walls 9 and the associated sloping plates 14. As depicted in FIGS. 5 and 7, the single hollow part 25b is formed by the bottom wall 7, front wall 8 and sloping plate 15. As illustrated in FIGS. 5 and 9, the two hollow parts 25c are formed by the front wall 8, the associated ones of the left and right side walls 9 and the associated sloping plates 16.

The body 5 according to the first embodiment is equipped with steel ribs 17a-17c arranged in the above-described hollow spaces 25a-25c, fixedly secured to the associated at least one combinations of the adjacent plural ones of the bottom wall 7, front wall 8 and left and right side walls 9 by welding to reinforce the associated at least one combinations of the walls, and having ridges 17a1-17c1 extending out from surfaces of the associated ones of the earth/sand anti-sticking devices, that is, the sloping plates 14-16. These ridges 17a1-17c1 are fixedly secured to the associated sloping plates 14-16 by welding. At least one steel rib is arranged for each of the above-described combinations. As shown by way of example in FIGS. 4, 5, 8 and 10, plural ones of the ribs 17a of triangular shape are arranged in each of the two hollow parts 25a formed by the bottom wall 7, the associated ones of the left and right side walls 9 and the associated ones of the sloping plates 14. The ridges 17a1 of these ribs 17a and the sloping plate 14 are fixedly secured to each other by welding. As illustrated by way of example in FIGS. 4, 5 and 7, the plural ribs 17b of triangular shape are arranged in the single hollow part 25b formed by the bottom wall 7, the front wall 8 and the sloping plate 15. The ridges 17b1 of these ribs 17b and the sloping plate 15 are fixedly secured to each other by welding. As depicted by way of example in FIGS. 4, 5 and 9, the ribs 17c of triangular shape are arranged in the two hollow parts 25c formed by the front wall 8, the associated ones of the left and right side walls 9 and the associated sloping plates 16 such that each hollow part 25c is provided with one rib 17c. The ridges 17c1 of these ribs 17c and the associated sloping plates 16 are fixedly secured to each other by welding.

As shown in FIGS. 4 and 5, the body 5 according to the first embodiment is also provided with steel-made, additional ribs 27a-27b arranged inside the above-described hollow parts 25a-25c such that each hollow part is provided with at least one additional rib. The additional ribs 27a-27c are fixedly secured to the associated at least one combinations of the adjacent plural ones of the bottom wall 7, front wall 8 and left and right side walls 9 by welding to reinforce the associated at least one combinations of the walls. The additional ribs 27a-27c are arranged such that they come into contact with the associated ones of the earth/sand anti-sticking devices, that is, the sloping plates 14-16. As shown by way of example in FIGS. 4 and 5, plural ones of the additional ribs 27a of triangular shape are arranged inside each of the two hollow parts 25a formed by the bottom wall 7, the associated ones of the left and right side walls 9 and the associated ones of the sloping plates 14 such that the additional ribs 27a are arranged in juxtaposition with the above-described ribs 17a and edge portions of these additional ribs 27a, said edge portions being located on the side of the associated sloping plate 14, can come into contact with the associated sloping plate 14. For example, the plural additional ribs 27b of triangular shape are arranged inside the single hollow part 25b formed by the bottom wall 7, the front wall 8 and the sloping plate 15 such that the additional ribs 27b are arranged in juxtaposition with the above-described ribs 17b and edge portions of these additional ribs 27b, said edge portions being located on the side of the sloping plate 15, can come into contact with the sloping plate 15. In addition, the additional ribs 27c of triangular shape are arranged inside the two hollow parts 25c formed by the front wall 8, the associated ones of the left and right side walls 9 and the associated ones of the sloping plates 16, for example, such that each hollow part 25c is provided with one additional rib 27c, the additional rib 27c are arranged in juxtaposition with the above-described rib 17c and an edge portion of the additional rib 27c, said edge portions being located on the side of the associated sloping plate 16, can come into contact with the associated sloping plate 16.

It is to be noted that as illustrated in FIGS. 4, 5 and 6, the plural ribs 17a and additional ribs 27a arranged in each hollow part 25a include those arranged at positions opposite the stiffeners 11 with the bottom wall 7 interposed therebetween and also those arranged at positions where the ribs are connected to the stiffeners 13 with the side wall 9 interposed therebetween. Similarly, as illustrated in FIGS. 4, 5 and 7, the plural ribs 17b and additional ribs 27b arranged in the hollow part 25b include those arranged at positions opposite the stiffeners 12 with the front wall 8 interposed therebetween and those arranged at positions opposite the body frames 6 with the bottom wall 7 interposed therebetween. Further, as depicted in FIGS. 4, 5 and 9, the plural ribs 17c arranged in the hollow parts 25c include that arranged at a position opposite the stiffener 12a with the front wall 8 interposed therebetween and also that arranged at a position opposite the stiffener 13 with the side wall 9 interposed therebetween.

In the payload section defined by the bottom wall 7, front wall 8 and left and right side walls 9 of the body 5 according to the first embodiment constructed as described above, a payload such as, for example, earth or sand is loaded in a heap as described above. In this state, the front wheels 1 and rear wheels 2 of the dump truck shown in FIG. 1 are driven to travel so that the work to haul the payload to a desired place is performed. After the payload on the body 5 is dumped at the desired place, traveling is performed again, for example, with no payload to a next place where another payload exists, and hauling work of the payload such as earth or sand onto the body 5 is performed there. Normally, such loading work and hauling work are repeatedly performed.

According to the above-described first embodiment, the plural steel ribs 17a-17c are arranged in the hollow parts 25a-25c formed between the earth/sand anti-sticking devices, specifically the sloping plates 14-16 arranged in the corner parts of the bottom wall 7, front wall 8 and left and right side walls 9 defining the payload section and the associated ones of the bottom wall 7, front wall 8 and left and right side walls 9 arranged opposite the sloping plates 14-16 and have the ridges 17a1-17c1 fixedly secured by welding to the sloping plates 14-16, respectively, so that by these ribs 17a-17c, the associated ones of the bottom wall 7, front wall 8 and left and right side walls 9 can be reinforced. Therefore, sufficient rigidity can still be assured even if the stiffeners 11, 12, 12a, 13 installed on the parts of the outer sides of the payload section are made fewer.

As the ribs 17a-17c are arranged in the hollow parts 25a-25c between the sloping plates 14-16 and the associated ones of the bottom wall 7, front wall 8 and left and right side walls 9, respectively, the ribs 17a-17c can be significantly reduced in shape and dimensions compared with the stiffeners 11, 12, 12a, 13 installed on the parts of the outer sides of the payload section. Accordingly, the total weight of the stiffeners 11, 12, 12a, 13 and the ribs 17a-17c can be significantly reduced compared with the total weight that would result if only stiffeners were installed in a large number, and therefore, the weight of the body 5 can be reduced.

As has been described above, the body 5 according to the first embodiment can assure a light weight and also sufficient rigidity. It is thus possible to increase the authorized payload of the payload section and to improve the efficiency of hauling work by the dump truck. Moreover, the dump truck can enjoy improved travel fuel efficiency, and therefore, can assure excellent economy.

The two walls that form any one of the combinations of associated ones of the bottom wall 7, front wall 8 and left and right side walls 9 are reinforced by the associated ones of the ribs 17a-17c, and therefore, the two walls can be set smaller in thickness. The setting of such a smaller wall thickness can, therefore, realize a further weight reduction. As a consequence, the authorized payload can be increased, and in addition, a contribution can be made toward improving the travel fuel efficiency. Further, the material cost for the walls can be reduced so that the manufacturing cost of the body 5 can be reduced. Furthermore, the setting of a smaller thickness for the walls to which the ribs 17a-17c are to be fixedly secured makes it possible to weld these walls together without needing beveling edge preparation upon welding them together. It is, therefore, possible to decrease the work man-hour required for welding the associated ones of the walls together and also to reduce the number of fillers to be consumed in the welding. This can also reduce the manufacturing cost of the body 5.

Further, the ridges 17a1-17c1 of the ribs 17a-17c and the sloping plates 14-16 are fixedly secured to each other by welding. Therefore, a load of a payload can be transmitted from the sloping plates 14-16 to the ribs 17a-17c, and fractions of the load as transmitted to the ribs 17a-17c can then be transmitted and distributed to the associated ones of the bottom wall 7, front wall 8 and left and right side walls 9. It is hence possible to reduce a load to be applied to each of the sloping plates 14-16, so that the sloping plates 14-16 can be provided with improved durability and a highly-reliable body structure can be realized.

As the earth/sand anti-sticking devices are formed of the sloping plates 14-16 which are in turn made of steel plates, these sloping plates 14-16 can be welded with the associated ones of the bottom wall 7, front wall 8 and left and right side walls 9. Therefore, these sloping plates 14-16 can be firmly and fixedly secured to the associated ones of the bottom wall 7, front wall 8 and left and right side walls 9, and a stable structure can be realized.

Further, the sloping plates 14-16 are arranged as discrete members from the associated ones of the bottom wall 7, front wall 8 and left and right side walls 9. The earth/sand anti-sticking devices can, therefore, be arranged with relative ease by welding the sloping plates 14-16 to the associated ones of the bottom wall 7, front wall 8 and left and right side walls 9 without needing cumbersome bending work for the formation of the earth/sand anti-sticking devices on the associated ones of the bottom wall 7, front wall 8 and left and right side walls 9. Therefore, the sloping plates 14-16 are highly practical.

Further, the ribs 17a-17c and the sloping plates 14-16 can be integrally arranged by performing welding at the ridges 17a1-17c1 of the ribs 17a-17c. It is hence possible to provide the payload section with high rigidity. This also makes it possible to realize a highly-reliable body structure.

The plural ribs 17a arranged in each hollow part 25a include those arranged at positions opposite the stiffeners 11 secured on the bottom wall 7 and also those arranged at positions opposite the stiffeners 13 secured on the associated side wall 9. A load of a payload, which is transmitted via the ribs 17a, can hence be surely transmitted to the stiffeners 11, 13 via the bottom wall 7 and the associated side wall 9. Similarly, the plural ribs 17b arranged in the hollow part 25b include those arranged at positions opposite the stiffeners 12 secured on the front wall 8 and those arranged at positions opposite the body frames 6 secured on the bottom wall 7. A load of the payload, which is transmitted via the ribs 17b, can hence be surely transmitted to the stiffeners 12 and the body frames 6 via the front wall 8 and the bottom wall 7. Further, the plural ribs 17c arranged in each hollow part 25c include that arranged at a position opposite the stiffener 12a secured on the front wall 8 and that arranged at a position opposite the stiffener 13 secured on the associated side wall 9. A load of a payload, which is transmitted via the ribs 17c, can hence be surely transmitted to the stiffeners 12a, 13 via the front wall 8 and the associated side wall 9. As a consequence, high rigidity can be assured, thereby making a contribution to the realization of a body structure of high reliability.

Owing to the provision of the additional ribs 27a-27c arranged in juxtaposition with the ribs 17a-17c in the hollow parts 25a-25c such that the additional ribs 27a can come into contact with the associated sloping plates 14-16, the sloping plates 14-16 come into contact with the additional ribs 27a-27c under fractions of a load of a payload as transmitted to the sloping plates 14-16 so that the load of the payload can be transmitted and distributed to the associated ones of the bottom wall 7, front wall 8 and left and right side walls 9. It is hence possible to reduce a load to be applied to each of the sloping plates 14-16, so that the sloping plates 14-16 can also be provided with improved durability by the additional ribs 27a-27c and a highly-reliable body structure can be realized.

Figure 11:
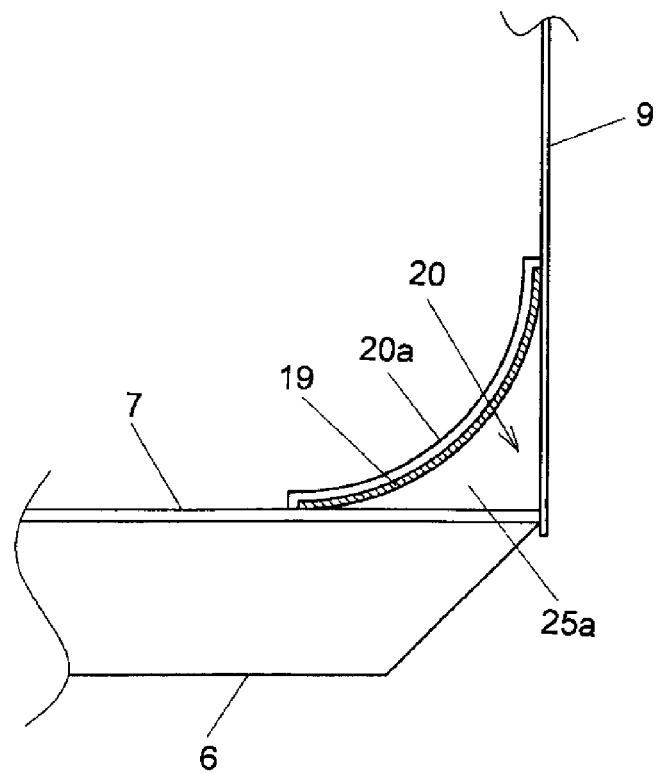
FIG. 11 is a fragmentary view illustrating a second embodiment of the body according to the present invention.

FIG. 11 is a fragmentary view illustrating the second embodiment of the body according to the present invention. The second embodiment, an essential part of which is illustrated in FIG. 11, is constructed with curved steel plates 19, each of which is arranged as a discrete member from the bottom wall 7 and the associated side wall 9 in place of the sloping plate 14 in the above-described first embodiment and forms a curved surface. Because of this constitution, ridges 20a of the ribs 20 arranged in each hollow part 25a, which is formed by the bottom wall 7 and the associated side wall 9 and curved plate 19, are formed with a profile conforming to the curved surface of the curved plate 19. Although not illustrated in any figure, similarly arranged are a curved steel plate, which is arranged as a discrete member from the bottom wall 7 and front wall 8 in place of the sloping plate 15 in the first embodiment and forms a curved surface, and ribs having ridges formed with a profile conforming to that of the curved plate. Although not illustrated in any figure, also similarly arranged are curved steel plates, each of which is arranged as a discrete member from the front wall 8 and the associated side wall 9 in place of the corresponding sloping plate 16 in the first embodiment and forms a curved surface, and ribs having ridges formed with a profile conforming to that of the curved plate. The remaining construction is similar to the above-described first embodiment.

Also in the second embodiment constructed as described above, the ribs 20 having the ridges 20a welded with the associated curved plate 19 are arranged in each hollow space 25a formed by the bottom wall 7 and the associated side wall 9 and curved plate 19, similar ribs having ridges welded with an associated similar curved plate are arranged in the hollow space 25b formed by the bottom wall 7, the front wall 8 and the similar curved plate, and similar ribs having ridges welded with an associated similar curved plate are arranged in each hollow space 25c formed by the front wall 8, the associated side wall 9 and the similar curved plate. The second embodiment can, therefore, bring about similar advantageous effects as the above-described first embodiment.

In each of the above-described embodiments, the ribs 17a, 17b are arranged in the associated hollow spaces 25a, 25b such that each hollow space is provided with plural ribs. However, at least one of the hollow spaces 25a, 25b may be provided with only one of the associated ribs 17a or 17b. In converse to the hollow spaces 25a, 25b, the hollow parts 25c are each provided with the single rib 17c. However, the hollow parts 25c may each be provided with a plurality of such ribs. These modifications can equally apply to the additional ribs 27a-27c.

REFERENCE SIGNS LIST

1 Front wheels
2 Rear wheels
3 Frames
4 Operator's cab
5 Body
6 Body frames
7 Bottom wall (steel-made member)
8 Front wall (steel-made member)
9 Side walls (steel-made members)
10 Canopy
10a Stiffeners
10b Stiffeners
11 Stiffeners
12 Stiffeners
12a Stiffeners
13 Stiffeners
14 Sloping plates (earth/sand anti-sticking devices)
15 Sloping plate (earth/sand anti-sticking device)
16 Sloping plates (earth/sand anti-sticking devices)
17a Ribs
17a1 Ridges
17b Ribs
17b1 Ridges
17c Ribs
17c1 Ridges
19 Curved plates (earth/sand anti-sticking devices)
20 Ribs
20a Ridges
25a Hollow parts (spaces)
25b Hollow part (space)
25c Hollow parts (spaces)
27a Additional ribs
27b Additional ribs
27c Additional ribs

The invention claimed is:

1. A body for a dump truck, said body being mountable on a frame of the dump truck, the body comprising:
a body frame, a bottom wall, front wall and left and right side walls arranged on the body frame, said bottom wall, front wall and left and right side walls defining a payload section for loading a payload therein,
an earth/sand anti-sticking device arranged in a corner part of the payload section to prevent earth or sand, which is to be loaded in the payload section, from sticking in the corner part, and
a steel member arranged outside and opposite the earth/sand anti-sticking device such that a space is formed between the steel member and the earth/sand anti-sticking device, wherein:
 the earth/sand anti-sticking device is made of steel plates,
 the steel member is formed of at least one combination of mutually-adjacent plural ones of the bottom wall, front wall and left and right side walls,
 the space comprises a hollow part formed by the respective walls in the at least one combination and the steel plates that form the earth/sand anti-sticking device,
 the body is provided with at least one steel rib arranged in the hollow part, fixedly secured to the respective walls in the at least one combination by welding to reinforce the respective walls in the at least one combination, and having a ridge extending out from surfaces of the steel plates that form the earth/sand anti-sticking device, and
 the ridge of the rib is arranged so as to come into contact with a space between edge surfaces of the steel plates that form the earth/sand anti-sticking device and is fixedly secured by welding to the steel plates in a width direction of the edge surfaces of the steel plates.

2. The body according to claim 1, wherein:
the body is further provided with a steel stiffener that is installed on an outer side of one of the bottom wall, front wall and left and right walls to reinforce the associated wall, and
the rib is arranged at a position such that the rib is connected to the stiffener with the associated wall interposed therebetween.

3. The body according to claim 1, wherein:
the body is further provided with at least one additional steel rib arranged inside the hollow part, fixedly secured to the respective walls in the at least one combination by welding to reinforce the respective walls in the at least one combination, and
the at least one additional steel rib comes into contact with the steel plates that form the earth/sand anti-sticking device.

4. The body according to claim 1, wherein:
the steel plates that form the earth/sand anti-sticking device:
 are arranged as a discrete member from the associated ones of the bottom wall, front wall and left and right side walls, and
 are formed of a sloping plate arranged aslant relative to the associated walls or a curved plate forming a curved surface.

5. The body according to claim 2, wherein:
the steel plates that form the earth/sand anti-sticking device:
 are arranged as a discrete member from the associated ones of the bottom wall, front wall and left and right side walls, and
 are formed of a sloping plate arranged aslant relative to the associated walls or a curved plate forming a curved surface.

6. The body according to claim 3, wherein:
the steel plates that form the earth/sand anti-sticking device:
 are arranged as a discrete member from the associated ones of the bottom wall, front wall and left and right side walls, and
 are formed of a sloping plate arranged aslant relative to the associated walls or a curved plate forming a curved surface.

* * * * *